Jan. 31, 1961  J. B. FRAGA  2,969,696
TRANSMISSION

Filed Nov. 3, 1958  2 Sheets-Sheet 1

INVENTOR.
John B. Fraga
BY
ATTYS

Jan. 31, 1961  J. B. FRAGA  2,969,696
TRANSMISSION
Filed Nov. 3, 1958  2 Sheets-Sheet 2

INVENTOR.
John B. Fraga
ATTYS

United States Patent Office 2,969,696
Patented Jan. 31, 1961

2,969,696

TRANSMISSION

John B. Fraga, 746 Wright St., Stockton, Calif.

Filed Nov. 3, 1958, Ser. No. 771,563

10 Claims. (Cl. 74—789)

This invention relates to transmissions such as are used in connection with various types of machines and are interposed between the drive or input shaft and the driven or output shaft. The transmission of the present invention may be effectively used in motor vehicles; propeller-driven aircraft; in machine tools of various kinds; and in certain instruments.

The major object of my invention is to provide a transmission mechanism which will produce an infinitely variable and controllable ratio of movement between the input and output shafts of the transmission and will also function as a torque converter. The mechanism, in its various forms and design, may be used wherever a variable ratio between the input and output shafts is desirable either with or without a commensurate increase or decrease in torque.

Another and important object of the invention is to so coordinate the various operating parts of the transmission that the force required to govern or determine the ratio of motion is at the discretion of the engineer designing the mechanism for a specific function. This force may be established at theoretically zero, while the factors affecting this condition are friction inherent in the mechanism and the inertia of the masses involved. Another condition may obtain wherein the forces are not in equilibrium, and a driving force is required to control or govern the ratio. Still another condition may be had wherein again the forces are not in equilibrium, but a drag or braking force is required to control and govern the ratio between the input and output shafts. A very small force only is therefore required to control the functions of the transmission, once a rotating or motion-imparting force is applied to the drive or input shaft thereof.

It is also an object of the invention to provide a transmission which is designed for ease and economy of manufacture.

An additional object of the invention is to provide a practical, reliable, and durable transmission, and one which will be exceedingly effective for the purpose for which it is designed.

These objects are accomplished by means of such structure and relative arrangement of parts as will fully appear by a perusal of the following specification and claims.

Figure 1:
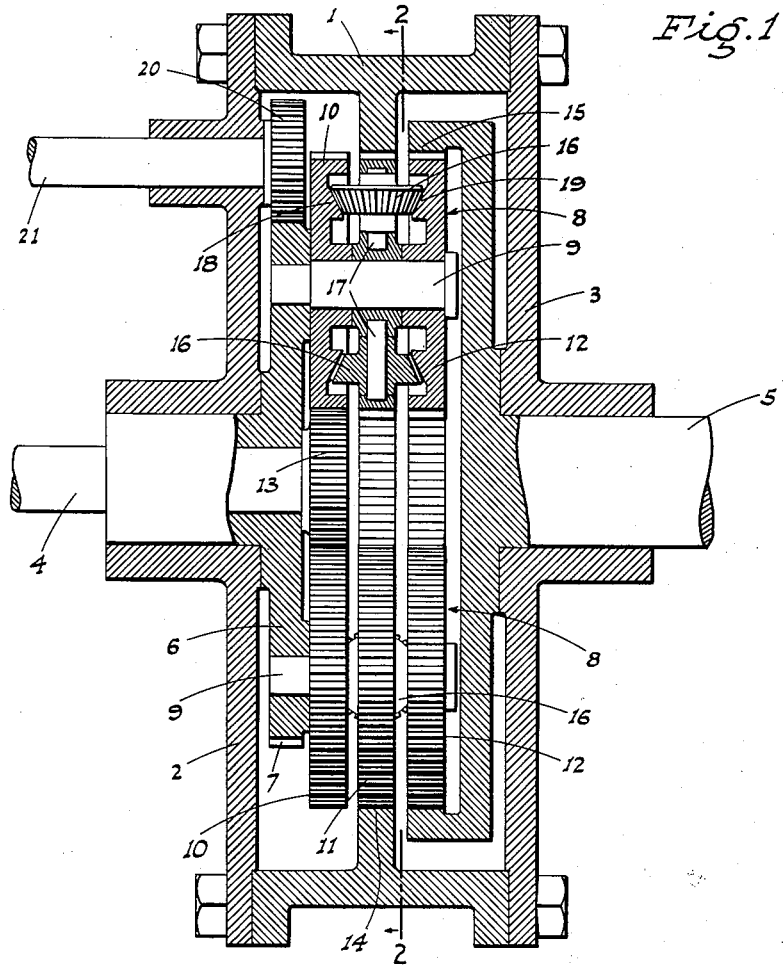
Fig. 1 is a diametral section of the transmission in a typical form.
Figure 2:
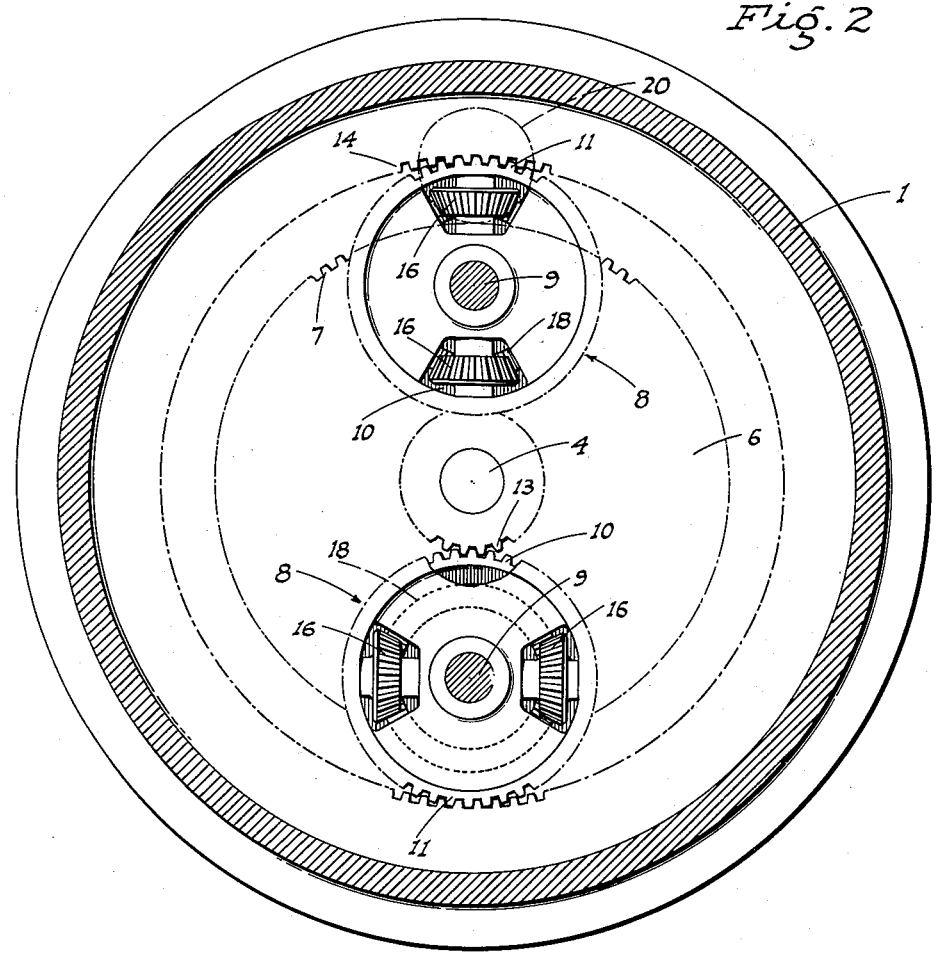
Fig. 2 is a sectional elevation on line 2—2 of Fig. 1.

Referring now to the drawings, and to the characters of reference marked thereon—and particularly at present to the structure shown in Figs. 1 and 2—the transmission comprises a fixed cylindrical housing or case 1 which includes spaced end plates 2 and 3. Projecting into the housing through and journaled in connection with the end plate 2 is a drive or input shaft 4, while projecting from within the housing through and journaled in the end plate 3 is a driven or output shaft 5, axially alined with shaft 4 and spaced therefrom.

Turnable on the input shaft 4 within case 1 adjacent the end plate 2 is a circular carrier 6 provided about its periphery with gear teeth 7; such carrier, which is thus also a gear, being concentric with said input shaft.

The carrier 6 supports at least a pair of planetary gear units, indicated generally at 8, disposed in opposed and equally spaced relation to input shaft 4, so as to be in balancing relation to each other. Since each unit 8 is a duplicate of the other, a description of one such unit will suffice for both.

Each planetary gear unit 8 comprises a mounting spindle 9 parallel to carrier 6 and projects therefrom in the direction of end plate 3. Turnable on the spindle 9 independently of each other are planetary gears 10, 11, and 12. Gear 10—which is nearest the carrier 6—meshes with a sun gear 13 fixed on the inner end of input shaft 4. Gear 11, which is the intermediate one of the planetary gear units, meshes with an internal gear 14 formed with or secured to case 1, and which gear is thus stationary. The remaining planetary gear 12 meshes with an internal gear 15 rigid with output shaft 5. Gears 10 and 12 are connected together in reversely rotating relation by means of opposed bevel pinions 16 mounted in gear 11 on opposed radial spindles 17 in said gear. The pinions 16, on their opposite sides, engage bevel gears 18 and 19 formed with the gears 10 and 12, respectively.

Rotation of the carrier 6 is controlled by means of a pinion 20 engaging carrier gear teeth 7; the pinion 20 being fixed on a control shaft 21 journaled in and projecting from the end plate 2 of the case 1 for operation. Rotation of shaft 21 may be controlled by any suitable motive force; an operating connection with input shaft 4; or various other means, including a braking means.

With a transmission constructed as above described, the principle of operation is as follows:

A given rotative force applied to the drive or input shaft 4 and sun gear 13 is transmitted to the point of mesh between said gear and the planetary gears 10. Pinions 16 in intermediate planetary gear 11 transmit this force to gear 12, and thence through gear 15 to the driven or output shaft 5, causing said shaft to be rotated in the same direction as input shaft 4. Because the force is applied to gear 15 (and shaft 5) at a point further from the axis of rotation than at the input shaft 4, a multiplication of the input force is obtained. Gears 16 mounted within the planetary gear 11, which in turn meshes with the case gear 14, react in the opposite direction, producing a balance of forces, or a quasi-state of equilibrium, with imbalance positive or negative, as the case may be. The carrier 6, on which the planetary gear units 8 are mounted, is thus free to rotate in either direction, or to remain stationary, until acted on by a governing force applied through pinion 20, which may serve as a brake.

It will be seen that if the forces interacting within the gearing mechanism are in equilibrium, the force required to rotate the carrier 6 and the planetary units 8 assembled thereon is theoretically zero. This means that no matter what the force magnitudes transmitted are, the governing force required is theoretically zero and is actually only that resulting from friction and intertia of the rotating parts. However, if the desire is that the forces be imbalanced negatively, then a positively applied force or motion will be required to produce the required ratio. If, on the other hand, it is desired that the force be imbalanced positively, then a negative motivating force, such as a brake, will be required to produce the desired ratio. In either case, the magnitude of the governing force is at the discretion of the designer.

In what may be called the basic form of the structure, as shown in Figs. 1 and 2 and above described, the planetary gears 11 and 12 are the same size and hence the corresponding internal gears 14 and 15 are also the same size. If therefore the carrier 6 and planetary gear units 8 thereon are rotated at a speed between that of the input and output shafts and the gears fixed therewith, no differential action will be had between gear 15 and the case gear 14. A neutral or zero-output condition then obtains.

If the carrier 6 and planetary gear units 8 are held against rotation about the shaft axis, the condition within the mechanism is such that a maximum of the desired torque results and the ratio between shafts 4 and 5 is commensurate or proportional to that torque ratio.

If the carrier 6 is rotated in a reverse direction to the direction of rotation of shaft 4, the ratio of rotation between shafts 4 and 5 is decreased, and the torque is increased proportionately. If this condition is continued, a point is reached where a direct or one-to-one ratio between the input shaft 4 and the output shaft 5 is achieved. Beyond this point, the output shaft 5 may be driven at a speed faster than that of the input shaft.

If the carrier 6 is rotated in the same direction as shaft 4, and at a speed faster than the neutral intermediate speed, the output shaft 5 will be rotated in a reverse direction.

An important feature or principle of this device is the fact that the governing force required to determine the transmission ratio may be theoretically zero, except for the friction inherent in the gears, bearings, etc., though this is not necessarily always the case, as previously noted.

Figure 3:
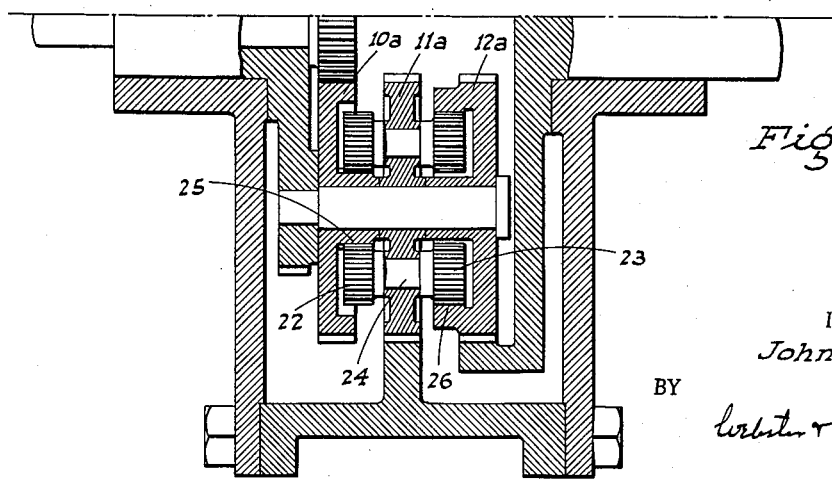
Fig. 3 is a radial section of the transmission having a modified form of gear connection.

In the arrangement shown in Fig. 3 the construction, as previously described, is generally the same. Each bevel pinion 19 of the intermediate planetary gear 11 however is replaced by a pair of spur pinions 22 and 23 fixed as a unit on a spindle 24 turnable in the intermediate planetary gear 11a parallel to the axis of said gear. Pinion 22 engages a gear 25 formed on the hub of planetary gear 10a, while the pinion 23 meshes with an internal gear 26 formed in planetary gear 12a.

Figure 4:
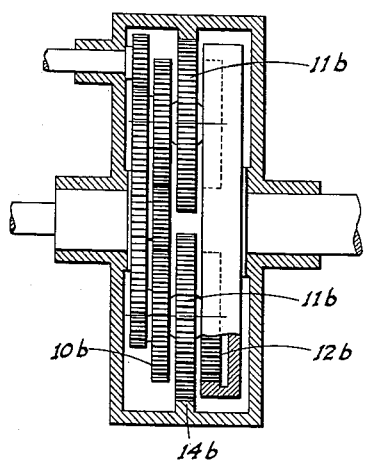
Figs. 4 and 5 are diagrammatic diametral sections of the transmission having different proportions of certain of the gears from what is shown in Fig. 1.
Figure 5:
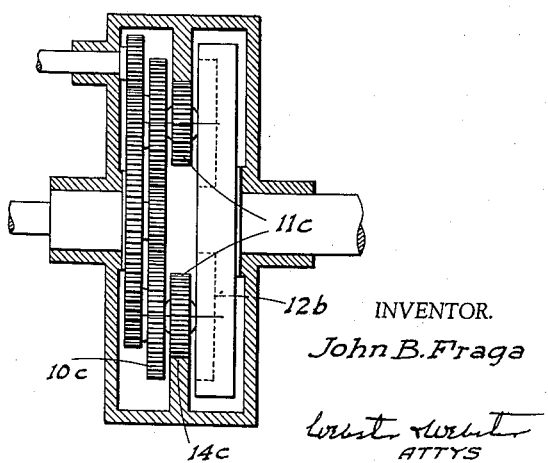

Also, in the forms illustrated in Figs. 4 and 5, the same general construction and principle of operation is obtained.

In Fig. 4, the intermediate gear 11b of each planetary gear unit is, however, larger than the other gears 10b and 12b of said unit, and the meshing case gear 14b is correspondingly larger in diameter.

In Fig. 5, on the other hand, the intermediate gear 11c of each planetary gear unit is smaller than the other gears 10c and 12c of said unit, and the meshing case gear 14c is correspondingly smaller in diameter.

These figures are illustrative of many possible variations, which consistently apply the basic principle of utilizing the torque reaction to bring about the desired quasi-balanced state of force or motion relationship within the structure to permit the governing of the shaft ratio by very small force relative to the magnitude of the force transmitted.

From the foregoing description it will be readily seen that there has been produced such a device as will substantially fulfill the objects of the invention, as set forth herein.

While this specification sets forth in detail the present and general construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A transmission comprising a case, separate input and output shafts projecting into the case, a rotary carrier in the case turnable axially of and relative to the input shaft, means to control the rotation of the carrier from exteriorly of the transmission, a planetary gear unit mounted on the carrier in radially offset relation to the axis of the carrier, and a mechanism including gearing connected between the input shaft, the planetary gear unit, and the output shaft to turn the gear unit and drive the output shaft from the input shaft with a multiplicity of the force applied to the input shaft.

2. A transmission comprising a case, separate input and output shafts projecting into the case, a rotary carrier in the case turnable axially of and relative to the input shaft, means to control the rotation of the carrier from exteriorly of the transmission, a planetary gear unit mounted on the carrier in radially offset relation to the axis of the carrier, and a mechanism including gearing connected between the input shaft, the planetary gear unit, the output shaft, and the case to turn the gear unit and drive the output shaft from the input shaft so as to produce a balance of forces which maintain a stage of equilibrium so as to enable the carrier to be controlled to rotate in either direction with a minimum of force.

3. A transmission comprising a stationary case, separate input and output shafts projecting into the case, a rotary controlled carrier in the case turnable axially of and relative to the input shaft, a planetary gear unit mounted on the carrier in radially offset relation to the axis of the carrier, a mechanism including gearing connected between the input shaft, the planetary gear unit, the output shaft, and the case to turn the gear unit and drive the output shaft from the input shaft so as to produce a balance of forces which maintain a state of equilibrium so that the carrier is free to rotate in either direction, or to be held stationary, and control means applied to the carrier from exteriorly of the transmission to control the movement thereof.

4. A transmission comprising a stationary case, input and output shafts projecting into the case in axially alined relation, a rotary carrier turnable on the input shaft within the case, a pinion fixed on the input shaft within the case, a gear fixed on the output shaft within the case, a planetary gear unit turnably mounted on the carrier in radially offset relation to the axis of the input shaft and operatively engaged with the pinion and said gear to turn the latter with the pinion, gearing between the case and the planetary gear unit to control the speed of rotation of the output shaft relative to the input shaft according to the speed of rotation of the carrier, and means applied to the carrier from exteriorly of the transmission to control the rotation of said carrier.

5. A transmission comprising a stationary case, input and output shafts projecting into the case in axially alined relation, a rotary carrier turnable axially of the input shaft within the case, a pinion fixed on the input shaft within the case, a gear fixed on the output shaft within the case, control means to rotate the carrier, and a planetary gear unit turnable on the carrier in radially offset but axially parallel relation to the axis of the carrier and input shaft and disposed between the carrier and said output shaft gear; said planetary gear unit comprising a first gear meshing with the pinion, a second gear meshing with said fixed gear, and a third intermediate gear; all said planetary unit gears being turnable relatively to each other, an internal gear in the case with which said third gear meshes, and gearing connected between the third gear and said first and second gears to rotate the latter in a direction opposite that of the first gear upon rotation of the third gear.

6. A transmission, as in claim 5, in which said output shaft gear is an internal gear.

7. A transmission, as in claim 5, in which said gearing comprises a bevel pinion mounted in the third gear on an axis radially of said gear, and bevel gears on the first and second gears concentric with the axis thereof and on opposite sides of the bevel pinion and with both of which bevel gears the bevel pinion meshes.

8. A transmission, as in claim 5, in which the control means comprises a gear concentric with the input shaft and fixed on the carrier, a pinion engaging said last named gear, and a control shaft fixed with the last named pinion journaled in and projecting from the case for operation.

9. A transmission comprising a stationary case, input and output shafts projecting into the case in axially alined relation, a rotary carrier turnable on the input shaft within the case, a pinion fixed on the input shaft within the case, a gear fixed on the output shaft within the case, control means to rotate the carrier, and a planetary gear unit turnable on the carrier in radially offset but axially parallel relation to the axis of the carrier and input shaft and disposed between the carrier and said output shaft gear; said unit comprising a first gear meshing with the pinion, a second gear meshing with said output shaft gear, and means to impart rotation to said second gear upon rotation of the first gear by the pinion.

10. A transmission comprising a stationary case, input and output shafts projecting into the case in axially alined relation, a rotary carrier turnable axially about the input shaft within the case, a pinion fixed on the input shaft within the case, a gear fixed on the output shaft within the case, control means to rotate the carrier, and a planetary gear unit turnable on the carrier in radially offset but axially parallel relation to the axis of the carrier and input shaft and disposed between the carrier and said output shaft gear; said planetary gear unit comprising a first gear meshing with the pinion, a second gear meshing with said output shaft gear, and a third gear; all the gears of said planetary unit being turnable relative to each other, a gear fixed in the case with which said third gear meshes and gearing connected between the third gear and said first and second gears to rotate both said first and second gears relative to the third gear upon rotation of the latter.

References Cited in the file of this patent

UNITED STATES PATENTS

| 1,703,016 | Rossi | Feb. 19, 1929 |
| 1,746,029 | Chorlton | Feb. 4, 1930 |

FOREIGN PATENTS

| 296,250 | Great Britain | Aug. 30, 1928 |
| 555,976 | France | Apr. 4, 1923 |